(12) United States Patent
Morgan

(10) Patent No.: US 7,279,058 B2
(45) Date of Patent: Oct. 9, 2007

(54) COMPOSITE CARPET CUSHION AND PROCESS

(75) Inventor: Charles W. Morgan, Redondo Beach, CA (US)

(73) Assignee: L&P Property Management Company, South Gate, CA (US)

( * ) Notice: Subject to any disclaimer, the term of this patent is extended or adjusted under 35 U.S.C. 154(b) by 242 days.

(21) Appl. No.: 11/040,939

(22) Filed: Jan. 21, 2005

(65) Prior Publication Data

US 2005/0126681 A1    Jun. 16, 2005

Related U.S. Application Data

(62) Division of application No. 09/563,697, filed on May 3, 2000.

(51) Int. Cl.
  *B32B 5/20* (2006.01)
  *B32B 31/08* (2006.01)
  *B32B 31/12* (2006.01)
  *B32B 31/26* (2006.01)

(52) U.S. Cl. ............ 156/79; 156/78; 156/324; 156/331.7

(58) Field of Classification Search .......... None
See application file for complete search history.

(56) References Cited

U.S. PATENT DOCUMENTS

| | | | |
|---|---|---|---|
| 3,011,218 A | 12/1961 | Mitten | |
| 3,271,215 A * | 9/1966 | Hoffman | 156/62.8 |
| 3,429,956 A | 2/1969 | Porter | |
| 3,463,690 A | 8/1969 | Converse et al. | |
| 3,681,485 A | 8/1972 | Lieberman | |
| 3,741,854 A | 6/1973 | De Goria | |

(Continued)

FOREIGN PATENT DOCUMENTS

CA    2320471 A1    3/2001

(Continued)

OTHER PUBLICATIONS

W. Fung, Coated and Laminated Textiles, 2002, Woodhead Publishing Ltd., pp. 87, 93 and 119-126, month unknown, 2000.

*Primary Examiner*—Sam Chuan Yao
(74) *Attorney, Agent, or Firm*—Conley Rose, P.C.; Kristen Jordan Harkins

(57) ABSTRACT

A composite carpet cushion incorporating a film layer, a foam layer and a fiber layer and a process of forming the composite carpet cushion. The film layer of the composite carpet cushion is a polyethylene film having a lateral dimension in the range of about 0.4 to 3 millimeters. The foam layer is urethane in an amount ranging from about 20 to 90 grams per square foot of the composite carpet cushion. The fiber layer is comprised of natural or synthetic fibers or a combination thereof having a lateral dimension in the range of about 1/16 to 7/16 inches. The process of forming a composite carpet cushion comprises applying an uncured urethane foam mixture uniformly on a polyethylene film layer. The combination foam and film layer is applied to a fiber layer which is proximate the foam layer. The composite layers are moved through a heated press which compresses the layers and causes the foam layer to react and cure to form a bond with the fiber layer and the film layer.

19 Claims, 2 Drawing Sheets

U.S. PATENT DOCUMENTS

| | | | |
|---|---|---|---|
| 3,804,699 A | 4/1974 | Johnson | |
| 3,829,343 A | 8/1974 | Remmert | |
| 3,895,087 A | 7/1975 | Ottinger et al. | |
| 3,914,503 A | 10/1975 | Brown et al. | |
| 3,926,700 A | 12/1975 | Hopkins et al. | |
| 3,940,525 A | 2/1976 | Ballard | |
| 3,989,869 A | 11/1976 | Neumaier et al. | |
| 4,037,013 A | 7/1977 | Sprague | |
| 4,211,817 A | 7/1980 | Buck et al. | |
| 4,216,177 A | 8/1980 | Otto | |
| 4,336,089 A | 6/1982 | Asperger | |
| 4,360,554 A | 11/1982 | Campbell et al. | |
| 4,512,831 A | 4/1985 | Tillotson | |
| 4,657,790 A * | 4/1987 | Wing et al. | 427/374.1 |
| 4,853,280 A | 8/1989 | Poteet | |
| 4,957,798 A | 9/1990 | Bogdany | |
| 5,045,389 A | 9/1991 | Campagna | |
| 5,082,705 A | 1/1992 | Rose | |
| 5,230,940 A * | 7/1993 | Bohm et al. | 428/95 |
| 5,531,849 A | 7/1996 | Collins et al. | |
| 5,540,968 A * | 7/1996 | Higgins | 428/95 |
| 5,612,113 A | 3/1997 | Irwin | |
| 5,617,687 A | 4/1997 | Bussey et al. | |
| 5,762,735 A | 6/1998 | Collins et al. | |
| 5,804,005 A | 9/1998 | Buck | |
| 5,846,461 A | 12/1998 | Collins et al. | |
| 5,854,144 A | 12/1998 | Hawley | |
| 6,189,279 B1 | 2/2001 | Fiechtl | |
| 6,253,526 B1 | 7/2001 | Murphy et al. | |

FOREIGN PATENT DOCUMENTS

| | | |
|---|---|---|
| GB | 2349356 A | 11/2000 |
| JP | 01288413 A | 11/1989 |
| JP | 07304126 A | 11/1995 |
| JP | 10110534 A | 4/1998 |
| JP | 10140806 A | 5/1998 |
| JP | 63162350 A | 7/1998 |
| WO | WO9208615 A1 | 5/1992 |
| WO | WO 200127382 A1 | 4/2001 |

\* cited by examiner

COMPOSITE CARPET CUSHION AND PROCESS

CROSS-REFERENCE TO RELATED APPLICATIONS

This is a Divisional Application of U.S. patent application Ser. No. 09/563,697, filed May 3, 2000, entitled "Composite Carpet Cushion and Process" and hereby incorporated by reference as if reproduced in its entirety.

FIELD OF THE INVENTION

The present invention relates to a composite carpet cushion incorporating a fiber layer, a urethane foam layer and a polyethylene skin layer and to a process for making a composite carpet cushion.

BACKGROUND OF THE INVENTION

Various types of carpet padding are used between flooring and decorative carpet to provide cushioning and support to the overlying carpet, thereby improving the stability and life of the carpet. A typical single layer pad is formed of re-bonded foam particles. Over a period of use, however, the foam particles crumble and the bond between the foam particles weakens, thereby causing the padding to lose its cushioning and support characteristics. Other single layer pads are comprised of natural or synthetic fibers, or a combination thereof, which are mechanically or adhesively bonded together. While sturdier, the fibers tend to separate over a period of wear, thereby causing the fiber padding to break down.

While single layer pads are generally proposed for use as carpet padding, it is also known in the art to use multi-layer padding. As described in U.S. Pat. No. 5,762,735 to Collins et al., a polymeric foam layer is sandwiched between, and bonded to, a liner sheet and a preformed layer of foam. The liner sheet is a layer of low density polyethylene, the polymeric foam layer is polyurethane and the preformed padding material is comprised of foam materials such as polyurethane form or re-bonded particle foam padding. Another multi-layer carpet pad comprising a liner sheet of polyethylene, two polyurethane foam layers and a second polyethylene liner sheet is described in U.S. Pat. No. 5,846,461 to Collins et al. Other multi-layer carpet pads are described in U.S. Pat. No. 5,531,849 to Collins et al. for a polyurethane layer sandwiched between two layers of polyethylene liner and in U.S. Pat. No. 5,045,389 to Campagna for a top layer of polyethylene, an intermediate layer of polyurethane foam and a base layer of rebonded polyurethane foam.

Processes for forming multi-layer carpet pads are described in the Collins et al. '735, '461 and '849 patents. For example, the Collins et al. '735 patent describes a process for making a laminated carpet pad by feeding a polyethylene liner sheet onto a conveyor belt and spraying thereon polyurethane foam which is uncured. Preformed foam padding is applied to the uncured polyurethane foam. The composite pad is fed between a pair of heated conveyor belts to cure the polyurethane foam and to adhere the foam to the liner sheet and the foam padding.

The Collins et al. '461 patent describes a process for making a laminated carpet pad by feeding a first liner sheet of cured polyurethane foam material and a polyethylene layer onto a conveyor belt. Uncured polyurethane foam is sprayed onto the cured polyurethane foam layer. A second liner sheet is applied to the uncured polyurethane foam to sandwich the polyurethane foam between the first and second liner sheets. The composite is fed between a pair of heated conveyor belts to cure the polyurethane foam and to adhere the foam to the first and second liner sheets.

The Collins et al. '849 patent describes a process for making a carpet pad by feeding a first polyethylene sheet onto a conveyor belt and spraying uncured polyurethane foam thereon. A second polyethylene liner sheet is applied to the uncured polyurethane foam. The composite pad is fed between a pair of heated conveyor belts to cure the polyurethane foam and to adhere the foam to the first and second liner sheets.

SUMMARY OF THE INVENTION

In accordance with the present invention, there is provided a novel composite carpet cushion having a fiber layer, a urethane foam layer and a polyethylene skin layer. The multi-layer configuration of the present invention improves the dimensional stability of the composite carpet cushion, particularly improved compression and loft maintenance, thereby resisting permanent set over time in high traffic areas. The urethane foam layer enhances the cushioning characteristic of the composite carpet cushion. It further binds the fibers of the fiber layer, thereby preventing their separation as well as the breakdown of the fiber layer over a period of use. The polyethylene layer provides an essentially water tight film that prevents unwanted fluids from penetrating and soaking into the composite carpet cushion, thereby preventing permanent damage from mildew and odors.

There is also provided a novel process for making the composite carpet cushion. The process of forming a composite carpet cushion comprises feeding a continuous layer of polyethylene film onto a heated conveyor belt moving in a longitudinal direction at a suitable linear speed. Uncured urethane foam is mixed and metered on a continuous basis and then applied to the polyethylene film from one or more spray units that are attached to a traverse reciprocating across a transverse dimension of the polyethylene film layer. The linear speed of the conveyor belt, the reciprocating speed and travel of the traverse and the spray volume and pattern are adjustable to provide the desired uniformity, lateral dimension or thickness and weight of the urethane foam layer applied to the polyethylene film layer.

The combination foam and film is transported by the conveyor belt through a pair of counter rotating drums which alter the orientation of the layers, thereby placing the foam layer underneath the film layer. A layer of fiber is transported between the pair of drums on a conveyor belt moving in a longitudinal direction for alignment with the combination foam and film layer proximate the foam layer. The conveyor belts move at substantially the same linear speed to define a double belt conveyor having a section which imparts heat and compression to the composite layers as they move therethrough. The heat causes the uncured urethane foam to react while the compression minimizes the air pockets or gaps between the layers. The urethane foam cures to form a bond to the adjacent fibers of the fiber layer and the polyethylene skin layer. The composite pad is trimmed longitudinally and cut transversely to the desired width and length, respectively, and preferably rolled for packaging.

DESCRIPTION OF THE DRAWINGS

For a more complete understanding of the present invention, and for further details and advantages thereof, reference is now made to the following Detailed Description of the Preferred Embodiments, taken in conjunction with the accompanying drawings, in which.

DETAILED DESCRIPTION OF THE PREFERRED EMBODIMENTS

Figure 1:
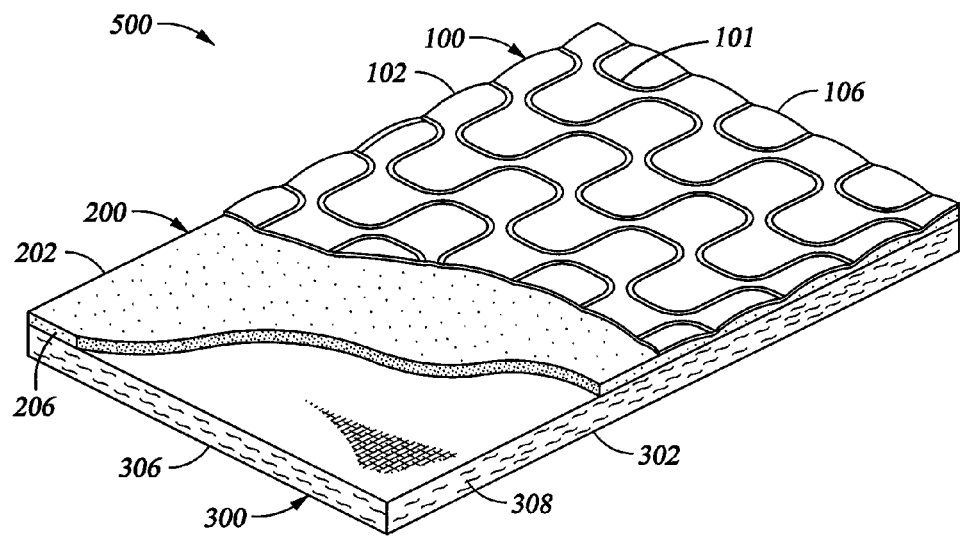
FIG. 1 provides a partial perspective sectional view with layers removed for purposes of clarity, of a composite carpet cushion constructed in accordance with the teachings of the present invention.
Figure 2:
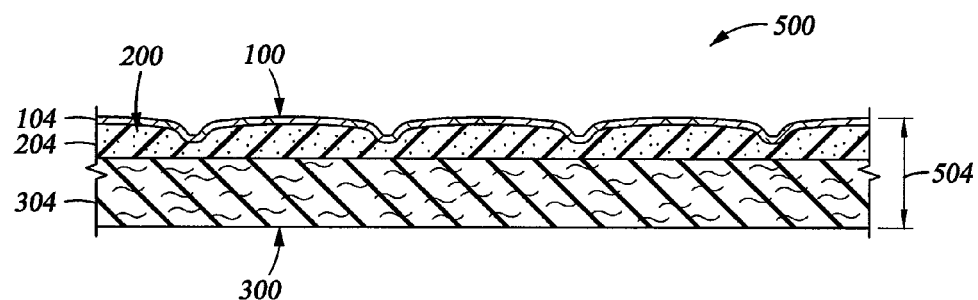
FIG. 2 provides a side view of the composite carpet cushion of FIG. 1.

Referring first to FIGS. 1 and 2, a composite carpet cushion 500 constructed in accordance with the teachings of the present invention will now be described in greater detail. As may now be seen, the composite carpet cushion 500 is generally comprised of a film layer 100, a foam layer 200 and a fiber layer 300. Preferably, the foam layer 200 is proximate the film layer 100 and the fiber layer 300, although other configurations are suitable so long as the film layer 100 is an outside layer. As disclosed herein, the film layer 100 is a continuous sheet of flexible material having a longitudinal dimension 102, a lateral dimension 104 and a transverse dimension 106. It is contemplated that the film layer 100 may include any number of flexible synthetic materials suitable for forming a film. The film of the present invention is preferably water resistant to prevent fluids from permeating though the composite carpet cushion 500. In one embodiment, the film layer 100 is polyethylene. In an alternative embodiment, the lateral dimension 104 of the film layer 100 is uniformly in the range of approximately 0.4 to 3 millimeters. In another alternative embodiment, the lateral dimension 104 of the film layer 100 is uniformly in the range of approximately 0.4 to 2 millimeters. In the preferred embodiment, the lateral dimension 104 of the film layer is about 0.5 millimeters. It will be appreciated by those skilled in the art that the melt temperature of the film layer 100 may vary depending on the composition and type of the film. For example, commercially available polyethylene film may have a melt temperature in the range of about 220 to 240° F.

The foam layer 200 has a longitudinal dimension 202, a lateral dimension 204 and a transverse dimension 206. The foam layer 200 is a cellular foam structure which is resilient along its longitudinal, lateral and transverse dimensions 202, 204 and 206. The foam layer 200 compresses when weight or a load is placed along its longitudinal, lateral and transverse dimensions 202, 204 and 206 and returns generally to its original state when the weight or load is removed. Preferably, the foam layer 200 is a flexible urethane foam. It is contemplated that a variety of formulations may be used to provide a suitable urethane foam for the composite carpet cushion 500. Formulations are widely known by those skilled in the art and are, therefore, not described in detail here. U.S. Pat. Nos. 5,762,735, 5,846,461 and 5,531,849, to Collins et al., the entire disclosures of which are incorporated herein by reference as if reproduced in their entirety, describe a variety of generally known urethane formulations. For example, the urethane foam layer 200 can be formed by the reaction of a variety of polyols with isocyanates, as is known by one skilled in the art. These components are mixed with water, catalysts and surfactants to form the flexible urethane foam 200 of the present invention. Suitable polyols include hydroxylterminated polyethers. The polyols may be capped for example with ethylene oxide to give a high resiliency foam. Suitable isocyanates include diphenylmethane diisocyante (MDI) and polymeric MDI. Catalysts which may be used in formulating the urethane foam include amine catalysts, such as triethylenediamine and bis (dimetghylaminoethyle) ether or blends thereof. Additionally an organotin catalyst may be used. Silicone and other surfactants may be included.

In one embodiment, 100 parts polyols are mixed with MDI isocyanates in an amount in the range of approximately 60 to 75 parts and react with about 5 parts waters and various catalysts and surfactants to form a flexible urethane foam suitable for use as the foam layer 200. In an alternative embodiment, 100 parts polyols are mixed with MDI isocyanates in an amount in the range of about 40 to 45 parts and react with water in an amount in the range of about 2.5 to 3 parts and various catalysts and surfactants. It is fully contemplated that, within the scope of the invention, a variety of formulations can be used to provide a flexible urethane foam layer 200 for the composite carpet cushion 500 of the invention. It is further contemplated that heat can be applied to the foam to accelerate the reaction.

It will be appreciated by those skilled in the art that the lateral dimension 204 of the foam layer 200 may be varied depending on the desired amount of cushioning for the composite carpet cushion 500. In one embodiment, the lateral dimension 204 can be in the range of about 1/64 to 7/16 inches to achieve a desired cushion quality for the composite carpet cushion 500. The weight of the foam layer 200 is generally in the range of about 20 to 90 grams per square foot of the composite carpet cushion 500. It is fully contemplated, however, that other weights are suitable to the present invention to achieve the desired cushion quality.

The fiber layer 300 of the composite carpet cushion 500 has a longitudinal dimension 302, a lateral dimension 304 and a transverse dimension 306. The fiber layer 300 includes fibers 308 which can be natural or synthetic. For example, cotton, wool, camel, llama and cashmere are suitable natural materials for use as the fibers 308 of the fiber layer 300. Alternatively, synthetic materials such as polyester, nylon and polypropylene are also suitable for use as the fibers 308 of the fiber layer 300. Of course, it should be fully understood by one skilled in the art that other natural and synthetic materials may also be suitable for use as the fiber layer 300 of the present invention.

The fiber layer 300 may be a blend of various types of fibers 308 having varying diameters and deniers, and which may be hollow, solid or crimped. Blending of different types of fibers 308 creates dead air spaces which contribute to the resiliency of the composite carpet cushion 500 of the present invention and lends to the integrity of the fiber layer 300. For example, shoddy material which is generally known in the art would be a blend suitable for use as the fiber layer 300. Shoddy material can be described as recycled fibers from clothing, bedding, fabric, carpet and other natural and synthetic materials. The materials are typically cleaned, shredded, mixed with other recycled fibers and compressed. A latex or other suitable adhesive is applied to the compressed fibers for bonding to produce a shoddy material.

In one embodiment, the density of the fiber layer 300 is in the range of approximately 16 to 40 ounces per square yard of fiber. Having such a density would generally result in the lateral dimension 304 of the fiber layer 300 being in the range of roughly 3/16 to 3/8 inches. In an alternative embodiment, the density of the fiber layer 300 is in the range of approximately 24 to 32 ounces per square yard of fiber. Having such a density would generally result in the lateral dimension 304 of the fiber layer 300 being in the range of roughly 1/4 to 5/16 inches. In a preferred embodiment, the density of the fiber layer 300 is about 24 ounces per square yard and the lateral dimension 304 of the fiber layer 300 is roughly 1/4 inch.

As is known in the art, the fiber layer 300 of the composite cushion 500 may be formed using one of several processes for converting a source of fiber, for example, the fibers 308, into the fiber layer 300. It is contemplated that the fibers 308 may receive an application of a resin to improve the structural integrity of the fiber layer 300. In the alternative, a portion of the fibers 308 may be low melting fibers which, upon application of heat thereto, will melt, thereby bonding high melt fibers within the fiber layer 300.

In the composite carpet cushion 500 of the present invention, the foam layer 200 is proximate the film layer 100 and the fiber layer 300 and bonded therebetween with any suitable bonding agents known in the art. For example, a bonding agent such as adhesive may be applied to at least one surface to be bonded. In one embodiment, the foam layer 200 is uncured polyurethane which, upon the application of heat thereto, reacts and cures to form a bond with the film layer 100 and the fiber layer 300.

To achieve desired characteristics, for example, to enhance the cushioning quality thereof, the composite carpet cushion 500 may have any suitable lateral dimension 504. It will be appreciated by those skilled in the art that the lateral dimension 504 of the composite carpet cushion 500 can be varied while still achieving the desired cushioning quality. In one embodiment, the lateral dimension 504 of the composite carpet cushion 500 may be as little as about 1/8 inch. In an alternative embodiment, the lateral dimension 504 of the composite carpet cushion 500 may be in the range of about 1/4 to 5/8 inch.

Figure 3:
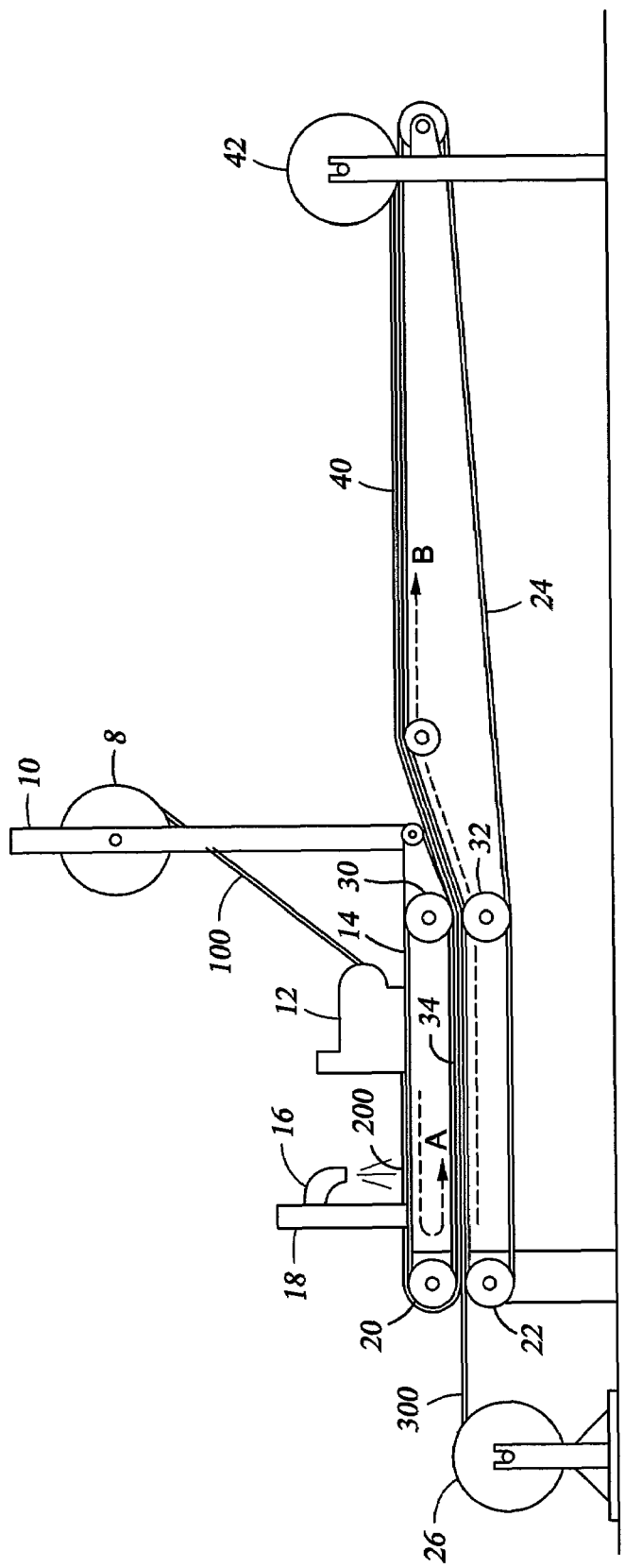
FIG. 3 provides a schematic illustration of a process for producing the composite carpet cushion of FIGS. 1 and 2.

Referring next to FIG. 3, there is shown a schematic illustration of a process which may be employed in producing the composite carpet cushion 500 in accordance with the present invention. Generally, a layer of foam 200 is sprayed across a transverse dimension 106 of a continuous layer of film 100 as it is transported along its longitudinal dimension 102. The combination film and foam layer 100 and 200 is then applied to a fiber layer 300 to form a composite carpet cushion 500. The composite carpet cushion 500 is compressed along lateral dimension 504 and heated to a temperature which causes the foam layer 200 to react and cure to form a bond with the fiber layer 300 and the film layer 200.

More particularly, the process of forming the composite carpet cushion 500 is accomplished by feeding a leading edge (not shown), along the transverse dimension 106, of the film layer 100 from a supply roll 8 mounted on a traverse station 10 through a rotatable drum 12 and onto a surface of conveyor belt 14. The film layer 100 is transported, along its longitudinal dimension 102, generally along a conveyor path A defined by the conveyor belt 14. Commercially available rolls of film are typically about 82 inches along their lateral dimension although other widths are both available as well as suitable for the present invention. Preferably, the conveyor belt 14 is a chain link belt. It should be fully understood, however, that alternative embodiments known by those skilled in the art are also within the scope of the present invention. The conveyor belt 14 is operated at any suitable line speed, typically in the range of about 14 to 20 feet per minute, but can vary as desired.

A composition of foam as set forth hereinabove, is mixed, metered and applied to the film layer 100 by one or more spray units 16 attached to a traverse 18 which reciprocates along transverse dimension 106 of the film layer 100 to form a substantially uniform layer 200 of foam. It is contemplated that the reciprocation speed and travel of the traverse 18, the distance between the traverse 18 and the conveyor belt 14 and the number and spacing of the spray units 16 can be adjusted to achieve the desired spray pattern of the foam, onto the film layer 100, to form the foam layer 200.

The leading edge (not shown) of the combination film and foam layer 100 and 200 traveling along conveyor path A is fed through a pair of counter rotating drums 20, 22. From a supply roll 26, a leading edge (not shown) of the fiber layer 300 is fed, along its transverse dimension 306 thereof, through the pair of counter rotating drums 20, 22 and onto the conveyor belt 24. In turn, the conveyor belt 24 transports the fiber layer 300, along its longitudinal dimension 302 thereof, generally along conveyor path B defined by conveyor belt 24. The combination film and foam is layered on the fiber layer 300 to form the composite carpet cushion 500. The fiber layer 300 is transported by the conveyor belt 24, preferably in substantial alignment, along its lateral dimension 304, with the lateral dimensions 104, 204 of the film and foam layers 100 and 200, the leading edges of the fiber and film layers 300 and 100 being substantially aligned to minimize material waste.

The conveyor belts 14, 24 are operated at substantially the same speed, and between counter rotating drums 20, 22 and 30, 32, collectively define a double belt conveyor 34 which is heated along a section thereof. The lateral dimension between the conveyor belts 14, 24 of the double belt conveyor 34 is adjustable, preferably along the heated section, to compress the composite carpet cushion 500 to the desired lateral dimension 504. The adjustment can be accomplished by varying the distance between the upper drums 20, 30 and the lower drums 22, 32. It is contemplated that the length of the double belt conveyor 34 between counter rotating drums 20, 22 and 30, 32 can be any suitable dimension. For example, the length can be in the range of about 30 to 40 feet.

Compression of the composite carpet cushion 500 also minimizes air pockets or gaps between the layers. As the film, foam and fiber layers 100, 200 and 300 are carried through the heated and compression section of the double belt conveyor 34, the heat accelerates the reaction of the foam mixture to form and to cure the foam layer 200 thereby bonding with the fiber layer 300 and the film layer 100. It will be appreciated by those skilled in the art that the temperature of the double belt conveyor 34 may be varied as desired. In one embodiment, the temperature of the double belt conveyor may be about 200° F. The heat and pressure of double belt conveyor 34 provides a mirror image pattern on the film layer 100 of conveyor belt 14. For example, the conveyor belt 14 having a chain link achieves a chain link pattern 101 on the film layer 100.

The composite carpet cushion 500 is carried along conveyor path B of the conveyor belt 24 onto run out table 40 and though a trimming station (not shown) wherein the composite carpet cushion 500 is trimmed longitudinally to achieve a desired transverse dimension 506 and cut transversely to a desired longitudinal dimension 502. Composite carpet cushion 500 may then be rolled onto a windup spool 42 for packaging.

Thus, there has been described and illustrated herein, a process of forming a composite carpet cushion having a film layer, a fiber layer and a heat-reactive foam layer, sandwiched between said film and fiber layers, which bonds to both the film and fiber layers upon the application of heat thereto. It should be clearly understood, however, that numerous variations and modifications of the methods disclosed herein will become apparent to those skilled in the art once the above disclosure is appreciated. Accordingly, it is fully intended that the claims which follow be interpreted to embrace all such variations and modifications.

I claim:

1. A method for constructing a three-layer composite carpet cushion underlayment having a foam layer positioned between a film layer and a fiber layer, comprising:

providing a layer of film, said layer of film having a first side surface;

applying a layer of uncured, heat-reactive foam to said first side surface of said layer of film; said layer of uncured, heat-reactive foam having a first side surface which contacts said first side surface of said layer of film and a second side surface;

forming a resiliency-enhanced layer of fibers from a blend of fibers of various types and further comprising shoddy material;

applying said layer of fiber to said second side surface of said layer of uncured, heat-reactive foam, said layer of fiber having a first side surface which contacts said second side surface of said layer of uncured, heat-reactive foam; and forming a three-layer composite carpet cushion underlayment by bonding said layer of uncured, heat-reactive foam to said layer of film and to said layer of fiber by curing said uncured, heat-reactive foam to form a layer of cured foam, said curing of said uncured, heat-reactive foam initiated after contact is established between said layer of uncured, heat-reactive foam and said layer of film and between said layer of uncured, heat-reactive foam and said layer of fiber;

wherein the bond between said layer of cured foam and said layer of fiber is established generally simultaneously with the bond between said layer of cured foam and said layer of fiber;

wherein said layer of cured foam enhances cushioning provided by said three-layer composite carpet cushion underlayment; and wherein said resiliency-enhanced layer of fibers enhances resistance to compression and loft maintenance of said tree-layer composite carpet cushion underlayment.

2. The method of claim 1, and further comprising minimizing air pockets or gaps between said layer of uncured, heat-reactive foam and said layer of fiber and between said layer of uncured, heat-reactive foam and said layer of film generally simultaneously with (1) said bonding of said layer of uncured, heat-reactive foam to said layer of film and (2) said bonding of said layer of uncured, heat-reactive foam to said layer of fiber.

3. The method of claim 2, wherein applying said layer of fiber to said second side surface of said layer of uncured, heat-reactive foam forms an unbonded, three-layer composite carpet cushion underlayment and wherein minimizing air pockets or gaps between said layer of uncured, heat reactive foam and said layer of fiber and between said layer of uncured, heat-reactive foam and said layer of film generally simultaneously with (1) said bonding of said layer of uncured, heat-reactive foam to said layer of film and (2) said bonding of said layer of uncured, heat-reactive foam to said layer of film further comprises applying pressure to said unboned, three-layer composite carpet cushion underlayment generally simultaneously with the applying of heat to said unboned, three-layer composite carpet cushion underlayment.

4. The method of claim 3, wherein applying heat to said unbonded, three-layer composite carpet cushion underlayment cures said layer of uncured, heat-reactive foam to bond said layer of uncured, heat-reactive foam to said layer of film and to said layer of fiber.

5. The method of claim 4, wherein said various types of fibers from which said resiliency-enhanced layer of fibers is formed include fibers of varying diameters and deniers.

6. The method of claim 5, wherein said fibers of varying diameters and deniers may be hollow, solid or crimped.

7. The method of claim 1, wherein applying said layer of uncured, heat-reactive foam to said layer of film further comprises spraying uncured, heat-reactive foam onto said first side surface of said layer of film.

8. The method of claim 7, wherein applying said layer of fiber to said second side surface of said layer of uncured, heat-reactive foam forms an unbonded, three-layer composite carpet cushion underlayment and wherein bonding said layer of uncured, heat-reactive foam to said layer of film and to said layer of fiber further comprises applying heat to said unbonded three layer composite carpet cushion underlayment.

9. The method of claim 8, and further comprising applying pressure to said unbonded, three layer composite carpet cushion underlayment generally simultaneously with the applying of heat to said unbonded, three layer composite carpet cushion underlayment.

10. The method of claim 1, wherein said various types of fibers from which said resiliency-enhanced layer of fibers is formed include fibers of varying diameters and deniers.

11. The method of claim 10, wherein said fibers of varying diameters and deniers may be hollow, solid or crimped.

12. A method for constructing a three-layer composite carpet cushion underlayment, comprising:

providing a sheet of water impermeable flexible material, said sheet of water impermeable flexible material having an upper side surface and a lower side surface;

spraying a generally uniform layer of uncured heat-reactive foam onto said upper side surface of said sheet of water impermeable flexible material, the spraying of said uncured, heat-reactive foam onto said upper side surface of said sheet of water impermeable flexible material forming a substrate having a lower portion formed from said sheet of water impermeable flexible material and an upper portion formed from said generally uniform layer of uncured, heat-reactive foam;

forming a resiliency-enhanced layer of fibers, from a blend of fibers of various types and further comprising shoddy material;

applying said layer of fiber to said substrate, said layer of fiber applied to said substrate such that said generally uniform layer of uncured, heat-reactive foam is sandwiched between said sheet of water impermeable flexible material and said layer of fiber;

forming a three-layer composite carpet cushion underlaying by establishing a bond between said sheet of water impermeable flexible material and said generally uniform layer of uncured, heat-reactive foam generally simultaneously with establishing a bond between said layer of fiber and said generally uniform layer of uncured, heat-reactive foam by curing said layer of uncured, heat-reactive foam to form a layer of cured foam; and wherein said layer of cured foam enhances cushioning provided by said three-layer composite carpet cushion underlayment; and wherein said resiliency-enhanced layer of fibers enhances resistance to compression and loft maintenance of said three-layer composite carpet cushion underlayment.

13. The method of claim 12, and further comprising:

altering the orientation of said substrate such that said lower portion of said substrate is now formed from said generally uniform layer of uncured, heat-reactive foam and said upper portion of said substrate is now formed from said sheet of water impermeable flexible material; and laying said lower portion of said substrate onto an upper side surface of said layer of fiber to form an unbonded, three-layer composite carpet cushion underlayment.

14. The method of claim 13, and further comprising:

simultaneously applying heat and pressure to said unbonded, three layer composite carpet cushion underlayment;

wherein the application of heat cures said uncured, heat-reactive foam, thereby effecting the generally simultaneous bonding of said sheet of water impermeable flexible material with said generally uniform layer of uncured, heat-reactive foam and the bonding of said layer of fiber with said generally uniform layer of uncured, heat-reactive foam; and wherein the application of pressure minimizes the presence of air pockets within said bonded, three-layer composite carpet cushion underlayment.

15. The method of claim 14, and further comprising forming a pattern on said lower side surface of said sheet of water impermeable flexible material.

16. The method of claim 12, wherein said various types of fibers from which said resiliency-enhanced layer of fibers is formed include fibers of varying diameters and deniers.

17. The method of claim 16, wherein said fibers of varying diameters and deniers may be hallow, solid or crimped.

18. The method of claim 14, wherein said various types of fibers from which said resiliency-enhanced layer of fibers is formed include fibers of varying diameters and deniers.

19. The method of claim 18, wherein said fibers of varying diameters and deniers may be hollow, solid or crimped.

* * * * *

UNITED STATES PATENT AND TRADEMARK OFFICE
CERTIFICATE OF CORRECTION

PATENT NO. : 7,279,058 B2
APPLICATION NO. : 11/040939
DATED : October 9, 2007
INVENTOR(S) : Charles W. Morgan It is certified that error appears in the above-identified patent and that said Letters Patent is hereby corrected as shown below:

On the Title Page, under item (56), References Cited, U.S. Patent Documents, please add: -- "4,515,646 5/1985 Walker et al." --

Claim 1, Col. 7, line 49, replace "tree-layer composite carpet cushion underlayment." with -- "three-layer composite carpet cushion underlayment." --

Claim 12, Col. 8, line 62, replace "underlaying" with -- "underlayment" --

Signed and Sealed this

Thirteenth Day of May, 2008

JON W. DUDAS
*Director of the United States Patent and Trademark Office*